US005606587A

United States Patent [19]
Barski et al.

[11] Patent Number: 5,606,587
[45] Date of Patent: Feb. 25, 1997

[54] DETERMINATION OF DIRECT X-RAY EXPOSURE REGIONS IN DIGITAL MEDICAL IMAGING

[75] Inventors: Lori L. Barski, Mendon; Robert A. Senn, Rochester, both of N.Y.

[73] Assignee: Eastman Kodak Company, Rochester, N.Y.

[21] Appl. No.: 620,074

[22] Filed: Mar. 21, 1996

[51] Int. Cl.$^6$ .................................................. G01N 23/04
[52] U.S. Cl. .................................................. 378/62
[58] Field of Search ............... 378/62, 48.2; 364/413.13

[56] References Cited

U.S. PATENT DOCUMENTS

| | | | |
|---|---|---|---|
| 4,731,863 | 3/1988 | Sezan et al. | 382/51 |
| 5,046,118 | 9/1991 | Ajewole et al. | 382/51 |
| 5,164,993 | 11/1992 | Capozzi et al. | 382/6 |
| 5,268,967 | 12/1993 | Jang et al. | 382/6 |

FOREIGN PATENT DOCUMENTS 0228042  8/1987  European Pat. Off. .

Primary Examiner—David P. Porta
Assistant Examiner—David Vernon Bruce
Attorney, Agent, or Firm—William F. Noval

[57] ABSTRACT

A method of determining direct x-ray exposure regions in digital medical imaging comprising the steps of: providing a digital medical image including a matrix of lines and columns of pixels; evaluating significant transitions in line and column profiles to determine appropriate line and column thresholds; evaluating all pixels which exceed the line/column threshold for structure by computing the variation within a moving window using a range statistic; accumulating within a histogram pixels which exceed a threshold for that particular line or column and which contain variation indicative of direct x-ray exposure; and analyzing the background histogram to determine the beginning intensity or code value (left point) of the background region.

13 Claims, 7 Drawing Sheets

DETERMINATION OF DIRECT X-RAY EXPOSURE REGIONS IN DIGITAL MEDICAL IMAGING

FIELD OF THE INVENTION

This invention relates in general to digital medical imaging and relates more particularly to a method of determining the direct x-ray exposure regions (background) in digital medical imaging, such as computed radiography imaging.

BACKGROUND OF THE INVENTION

In the field of digital medical imaging, particularly computed radiography, photostimulable phosphors are used for image acquisition. The dynamic range of these devices is linear over a 10,000:1 range as compared to a 40:1 range for x-ray film. Because of this huge range of detectable exposures, the necessity of re-imaging a patient due to improper selection of exposure factors is virtually eliminated. However, with the decoupling of the acquisition media from the display device, it is necessary to develop a mapping function, often in the form of a look-up-table (LUT), which will optimally render the image on the desired output medium (CRT display, film, reflection print).

In developing the optimal tone scale, it has been observed that several key factors contribute to the acceptability of the resulting image. First, it is desirable to present the direct x-ray exposure regions as black as possible. Second, it is necessary to preserve the perceptibility of the skin-line in various exams, such as extremities. In order to be successful at meeting these requirements, one needs to identify in what code-value range the background pixels reside. Having done this, a tone scale algorithm can then make the necessary adjustments to ensure that both criteria are met.

The problem of background detection falls into the domain of medical image segmentation. Two general methodologies exist; 1) histogram analysis, and 2) spatial/texture analysis (possibly combined with gray level intensity information provided by the histogram). Of the first class of methods, U.S. Pat. No. 5,046,118, inventors Ajewole, et al., discloses a method which uses the concept of partial entropy to divide the histogram into a background region and a non-background region. U.S. Pat. No. 5,164,993, inventors Capozzi et al., refers to the latter method and uses it on both the linear and logarithmic histograms, with some additional provisions for conditions when the background point is found at the top of a peak. EP Patent Appln. 288,042, inventors Tanaka et al., discloses a method for finding background and foreground (which are areas of an image that have received very little radiation due to the use of radiation limiting devices such as collimator blades) using a histogram divided into a number of sections by an automatic thresholding procedure. In Tanaka, a discriminant analysis, combined with information about the exam type, exposure technique and desired body portion to be displayed, is then used to adjust the separation points between the sections until the desired ranges for the foreground, object, and background regions are found.

As part of the second group of methodologies, U.S. Pat. No. 5,268,967, inventors Jang et al., discloses a four step method which involves morphological edge detection, block generation, block classification, and block refinement. Segmentation via texture analysis using well known texture features and a neural network classifier is disclosed in Barski et al., "A Neural Network Approach to the Histogram Segmentation of Digital Radiographic Images", ANNIE '93 Conference Proceedings.

The methods disclosed in Ajewole, Capozzi, and Tanaka, above, may not be useful when the background is varying in a nonuniform way or when multiple background peaks exist in the histogram of the image. The method disclosed in Jang is useful in certain applications but complex processing stages are involved which are time consuming. The texture analysis method is very slow when running in a software implementation and only modestly reliable.

SUMMARY OF THE INVENTION

According to the present invention, there is provided a solution to the problems of the prior art. The present invention is simple to implement, is fast, accommodates non-uniform backgrounds, can deal with the problem of multiple background levels, and is able to determine if no background is present.

According to a feature of the present invention there is provided a method of determining direct x-ray exposure regions in digital medical imaging comprising the steps of:

providing a digital medical image including a matrix of lines and columns of pixels;

evaluating significant transitions in line and column profiles to determine appropriate line and column thresholds;

evaluating all pixels which exceed the line/column threshold for structure by computing the variation within a moving window using a range statistic;

accumulating within a histogram pixels which exceed a threshold for that particular line or column and which contain variation indicative of direct x-ray exposure; and analyzing the background histogram to determine the beginning intensity or code value (left point) of the background region.

DESCRIPTION OF THE PREFERRED EMBODIMENTS

Figure 7:
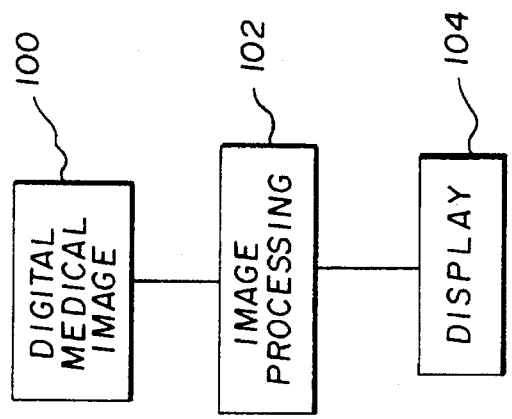
FIG. 7 is a block diagram of apparatus in which the method of the present invention can be used.

Before describing in greater detail the method of the present invention, there will be described apparatus in which the method may be practiced. As shown in FIG. 7, a digital medical image source 100 can include a medical image archive, storing projection radiography digital images, a computed radiography reader, an x-ray film digitizer, or the like. The digital medical image from source 100 includes an array or matrix of lines and columns of pixels having a gray scale range of a predetermined range of bits or code values (e.g., 8 or 12 bits). The digital medical image from source 100 is processed by image processor 102. Image processor 102 can be a digital computer having well known components such as memory, a central processing unit, input and output devices, etc. Image processor 102 is connected to a display 104 for displaying the processed image, the original image, data, and the like. A hard copy output such as a printer may also be provided. In general, the method of the present invention is practiced in image processor using well known computer programming techniques.

Figure 1A:
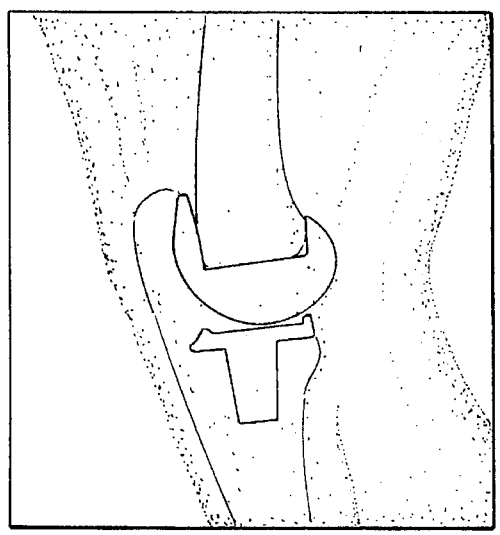
FIGS. 1a and 1b are respectively an x-ray of a knee region and a line profile through the knee prosthesis.
Figure 1B:
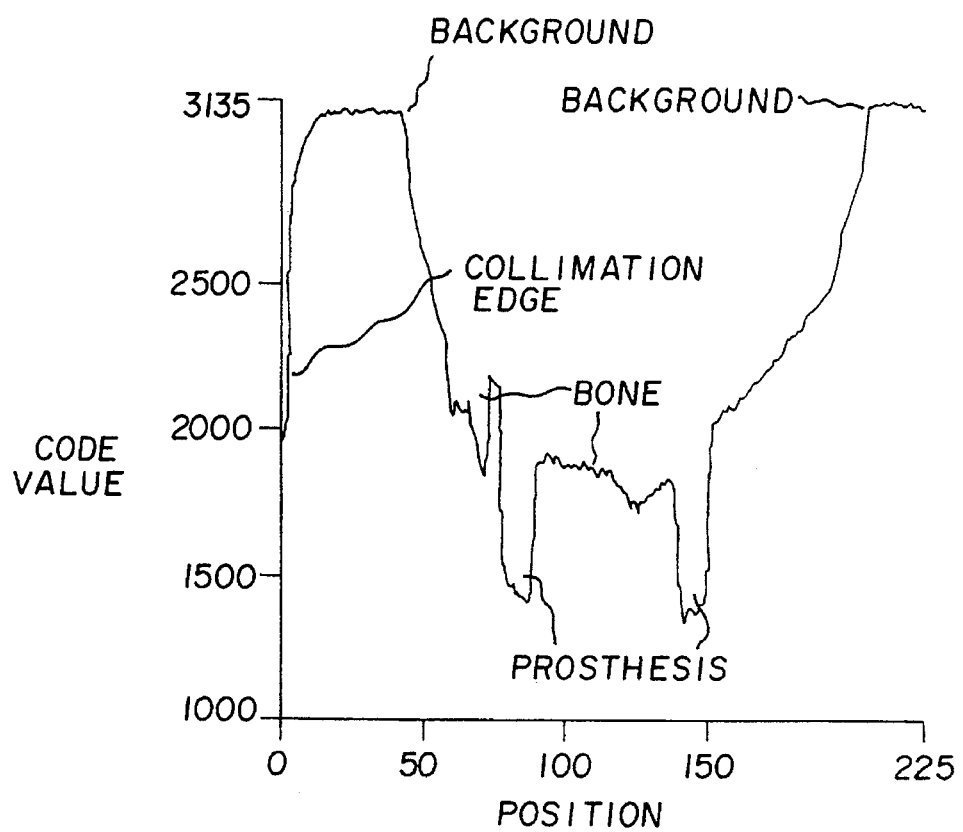

At the heart of the method of the present invention is the analysis of transition segments which are portions of a profile. FIG. 1*b* depicts a typical line profile taken horizontally at line 129 of the x-ray image shown in FIG. 1*a*. Significant slopes exist due to the transition from foreground to background at the collimator edge, from background to body part at the skin line, from bone and soft-tissue to the prosthesis, from the prosthesis to bone and soft-tissue, and finally from soft tissue to the background. The method of the present invention builds a histogram of background pixels by evaluating these significant transitions in the image.

Figure 2:
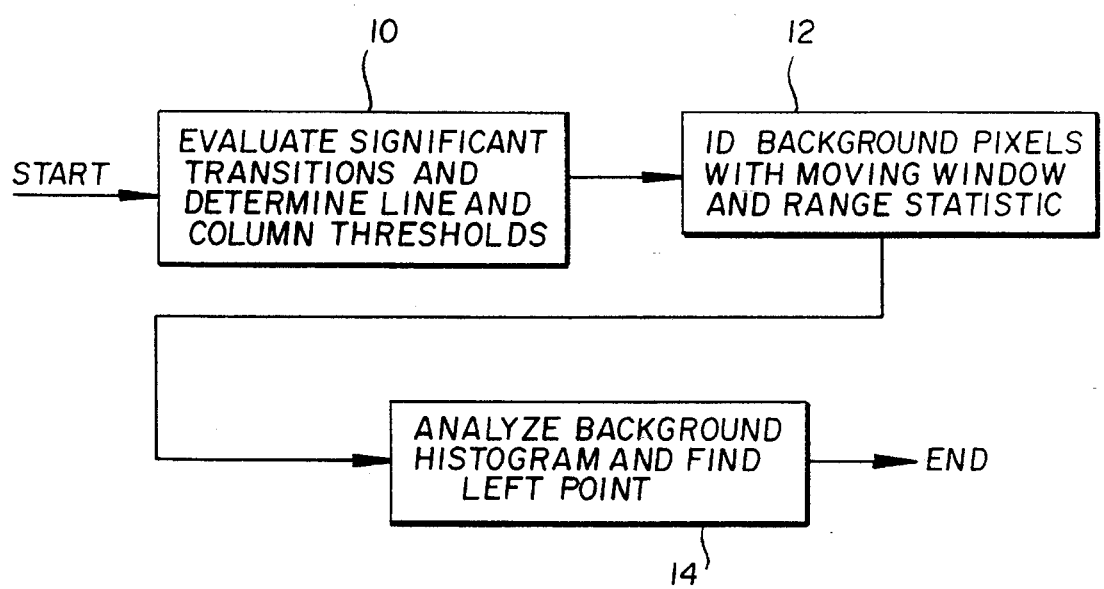
FIG. 2 is a block diagram of the method the present invention.

Referring now to FIG. 2, there is shown a simplified block diagram of the method of the present invention. First, each line and column is evaluated by using the high code-value range of significant transitions to establish appropriate line and column thresholds (box 10). These thresholds set the minimum code value level that a pixel must exceed in order to be considered a possible background candidate. Next, background pixels are identified with a moving window and range statistic (box 12). All pixels which exceed the line/column threshold are evaluated for structure by computing the variation within a 1-D neighborhood. Then, pixels which contain variation indicative of direct x-ray exposure and exceed the line/column threshold, are accumulated in a histogram (box 14). The histogram is then analyzed to determine if background exists, and if so, to find the beginning code value (also called left point) of the background region.

Following are more detailed descriptions of the above steps of the method of the present invention.

Determination of Line and Column Thresholds

By definition, a transition is a continuously increasing or decreasing segment of a line profile (in preferred embodiment no smoothing applied). Sometimes, a background transition posses a large slope, similar to that seen in FIG. 1*b*, as one moves from the low code values of the collimation blade to the high code values of direct x-ray exposure (FIG. 1*b*, positions 0–10). In other places, background transitions exist with relatively moderate slope (FIG. 1*b*, positions 175–200) where the profile is passing from soft tissue to background. Interestingly, transitions from soft tissue to bone are typically quite short due the signal modulation which occurs in bone. The transitions from bone to the prosthesis and prosthesis to soft tissue have significant slopes, yet the width of the transitions are relatively small and the high end of each transition occurs at a significantly reduced code-value than does direct exposure.

Each line and column profile is scanned for a continuously increasing or decreasing transition. A transition is characterized by its slope, $\Delta y/\Delta x$, where $\Delta y$ corresponds to the transitions change in code value and $\Delta x$ corresponds to the transitions width or change in 1-D spatial position. Also, a transition is characterized by its width. The high end of each transition is referred to as the transition peak. For each line/column, the corresponding threshold is determined to be the lowest of all the transition peaks found in that line or column. The lowest transition peak is used as a floor threshold. For lines/columns which do not possess any candidate transitions, we use as a threshold 95% of the average of transition peaks of all of the significant transitions. With the line and column thresholds now in place, our next step is to hone in on the true background pixels.

Indentification of Background Pixels

For each line and then column, the high and low code values are found. If the range is less than a preselected value (e.g., 800 code values (0.8 logE)) and the highest pixel is less than the floor threshold, we skip the line/column in question. Such conditions are indicative of foreground. Otherwise, we utilize a range statistic to characterize the variation in pixels using a moving window (typically of size 3) which contains pixels exceeding our line threshold.

Using the range to approximate the standard deviation is a well known concept in process control when small sample distributions are being studied. For small samples from a normal population, it can be shown that the range is nearly as efficient for estimation as is the sample standard deviation (s), based upon the expectation of the range, E(R). It can be shown that E(R) is a constant dependent on the number of samples (n) times $\sigma$. Tables are available for the normal variable case which express E(R) in terms of $\sigma_x$ for various sample sizes. This relationship is used for the purpose of ease of computation. Thus, we want to decide if a particular pixel, which exceeds our line/column threshold, belongs to the background. If the variation around the pixel is within $\pm 3\sigma$ of the expected variation, where $\sigma$ is defined by the noise characteristics of the acquisition system, then we consider the pixel to be background. Otherwise, we consider the pixel to be part of important structural variation. The test condition used is:

$$\frac{x_r}{d_n \sqrt{n}} < 3\sigma_z, d_n = 1.693 \text{ for } n = 3$$

where $x_R$ is the range (high—low code value) over n samples; $d_n$ is a constant which defines the relationship of the range to standard deviation $d_n = \mu_R/\sigma_x$; z is the index into the noise array which is chosen to be the high code value for the range; and $\sigma_z$ is the system noise. We use the highest value in the range as the index for the noise array because it results in the lower s value, which makes the test more difficult to pass.

Histogram Analysis of Accumulated Background Pixels

Once the accumulation of candidate background pixels is completed and the histogram is formed, the histogram is smoothed by a Gaussian function (preferred embodiment with $\sigma=13$) and normalized by the highest peak to a value of 1. The highest code value (aka right point) of the background histogram, although not of any use from a tone scale perspective, is useful for testing if the pixels found as background candidate are truly background since the background right point should be very close in value to the last code value of the gray level histogram of the image. We find the right point by searching backwards from the maximum entry of the background histogram, until the frequency exceeds a threshold [preferred embodiment (0.01)]. Defining the left point of the background histogram is less obvious, because of the distribution of code values which often overlap, for example between soft tissue and background. The first determination of the left point is made by searching down the left side of the peak to the point where the histogram falls below a threshold (which is body part dependent). There is the possibility of more than one significant peak in the background histogram, so we perform a second search for multiple peaks, from the far right to the left. If we find a significant peak that is relatively close to the previous peak, we increment our peak count and continue searching for additional peaks until the frequency falls below a threshold.

From a tone scale point of view, it would be a grave error to detect background when none existed. As mentioned above, one check we make is the difference between the right point of the background histogram and the last code value of the gray level histogram. If this difference is large (>300, for example in preferred embodiment), we assume that there is no direct x-ray exposure. Additional conditions which are indicative of no background are: if the width of the peak as defined by the left and right points is large (>650); if the distance from the peak to the last code values of the gray level histogram is large (>300); and if less than 5 significant transitions are found in an image. It will be understood that other threshold examples are appropriate for digital images of different pixel depth. The above values are exemplary for a digital image having a 12-bit pixel depth with code value range of 0–4095 code values.

Segmentation Results: Histogram vs. Spatial Segmentation Mask

The fundamental problem of background segmentation, as it relates to computed radiography, can be thought of as a classification of each pixel to either the category of background or non-background. Describing the results of this process can take several forms—that of a histogram, or of a spatial mask. The preferred embodiment of this invention is to describe the segmentation results in the form of a histogram. This is due to several reasons. First, the robustness added by the histogram analysis is essential. Second, possible later processing stages of skin line detection and tone scale generation only require a single value corresponding to the beginning code value of the direct x-ray exposure region. The histogram representation of the segmentation results facilitates this quite nicely. Lastly, the histogram analysis has the advantage of speed.

However, if creating a spatial segmentation mask is desired, several approaches are feasible. For example, the histogram analysis could be performed on a very coarse level, possibly only processing every third line. Then a second pass would be necessary which would identify pixels which demonstrate proper noise characteristics indicative of background, and which exceed the threshold of the beginning code value of the direct x-ray exposure region from the histogram analysis. A similar approach would be to mark all the pixels in the first pass which are candidates based upon transition and noise characteristics, and, then, after analyzing the histogram, set marked pixels which are less than the beginning code value of the direct x-ray exposure region back to their original value. Mask images shown in FIGS. 3c, 4c, 5c are the result of binarizing the original image at a threshold equal to the left point of the background histogram and should not be interpreted as spatially derived segmentation masks.

EXAMPLES

Figure 3A:
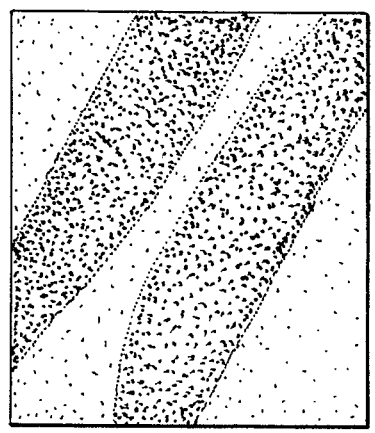
FIGS. 3a–c, 4a–c, and 5a–c are examples of the performance of the method of the present invention, wherein the 'a' FIGS. are original x-rays of body parts, the "b" FIGS. are histograms of the original figures and the direct exposure region detected, and the "c" FIGS. are depictions resulting from thresholding the image at a threshold equal to the background left point.
Figure 3B:
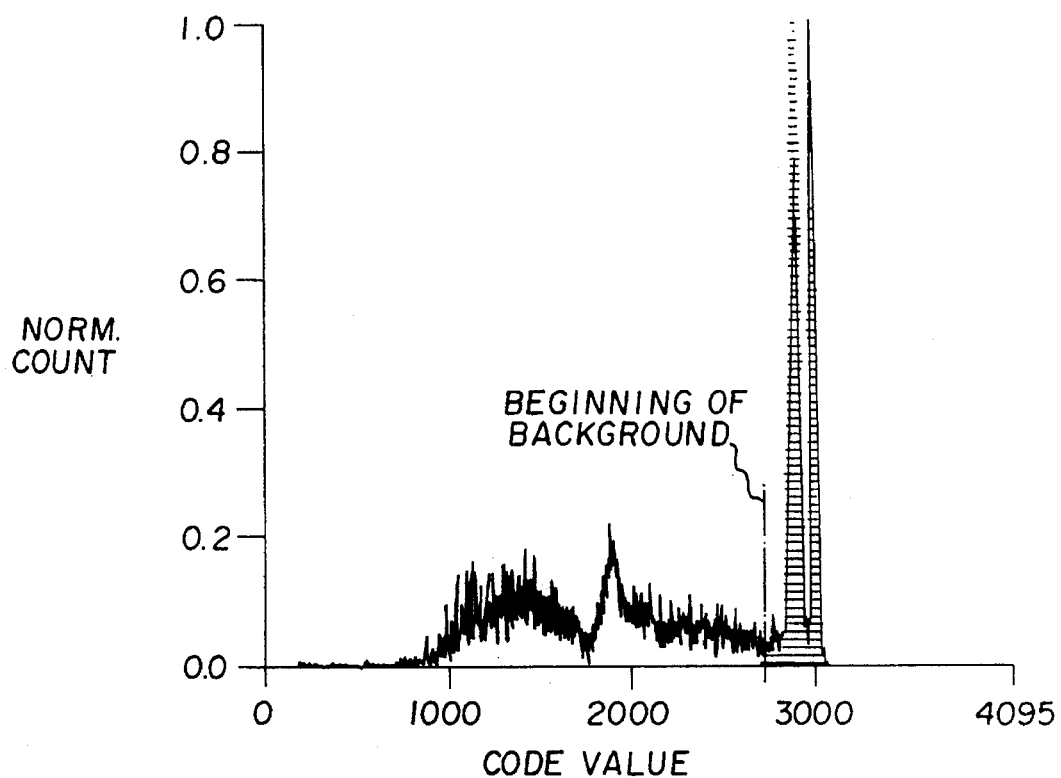
Figure 3C:
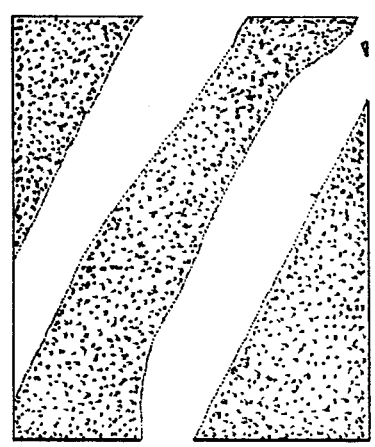
Figure 4A:
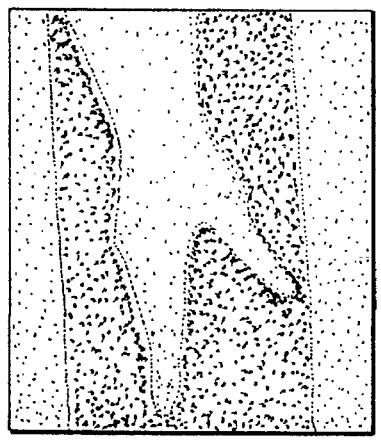
Figure 4B:
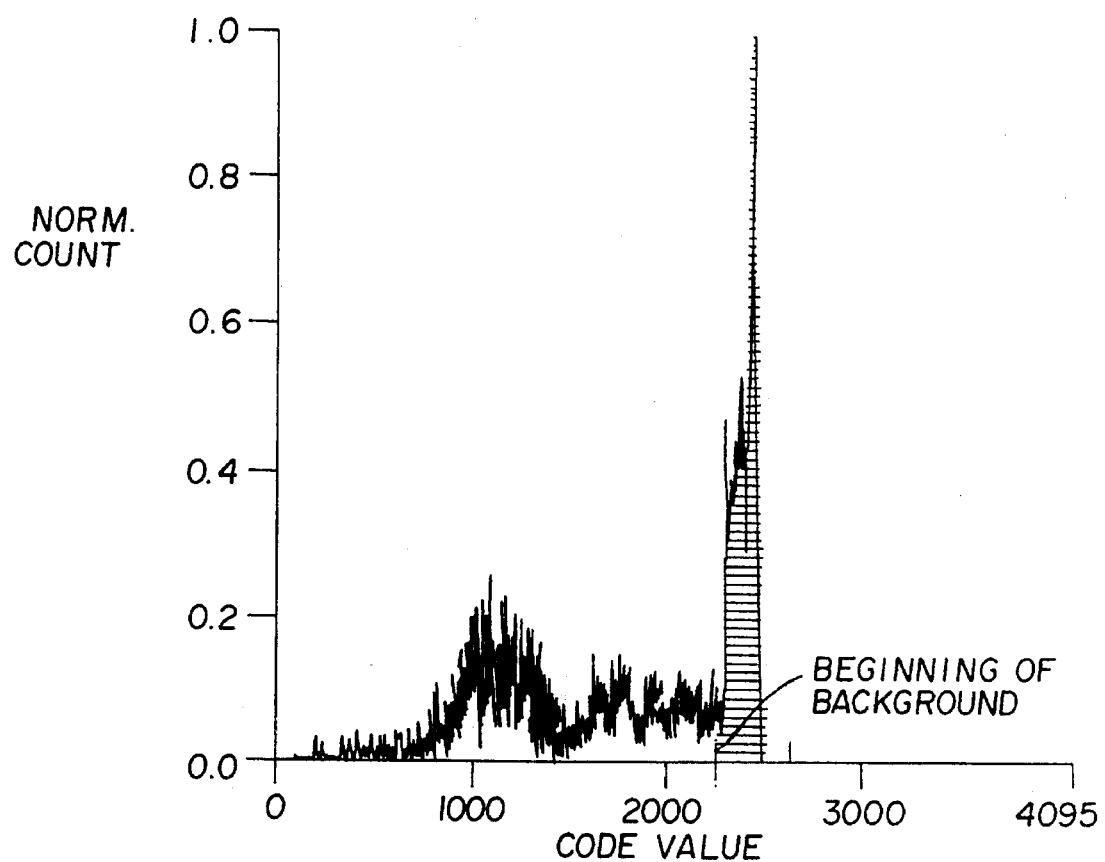
Figure 4C:
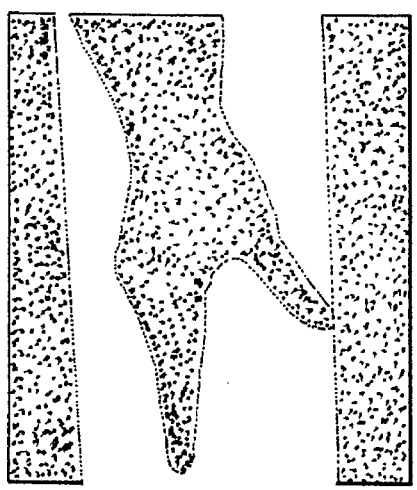
Figure 5A:
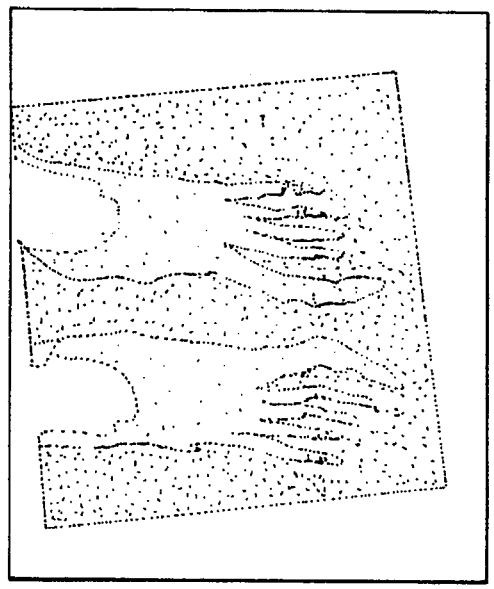
Figure 5B:
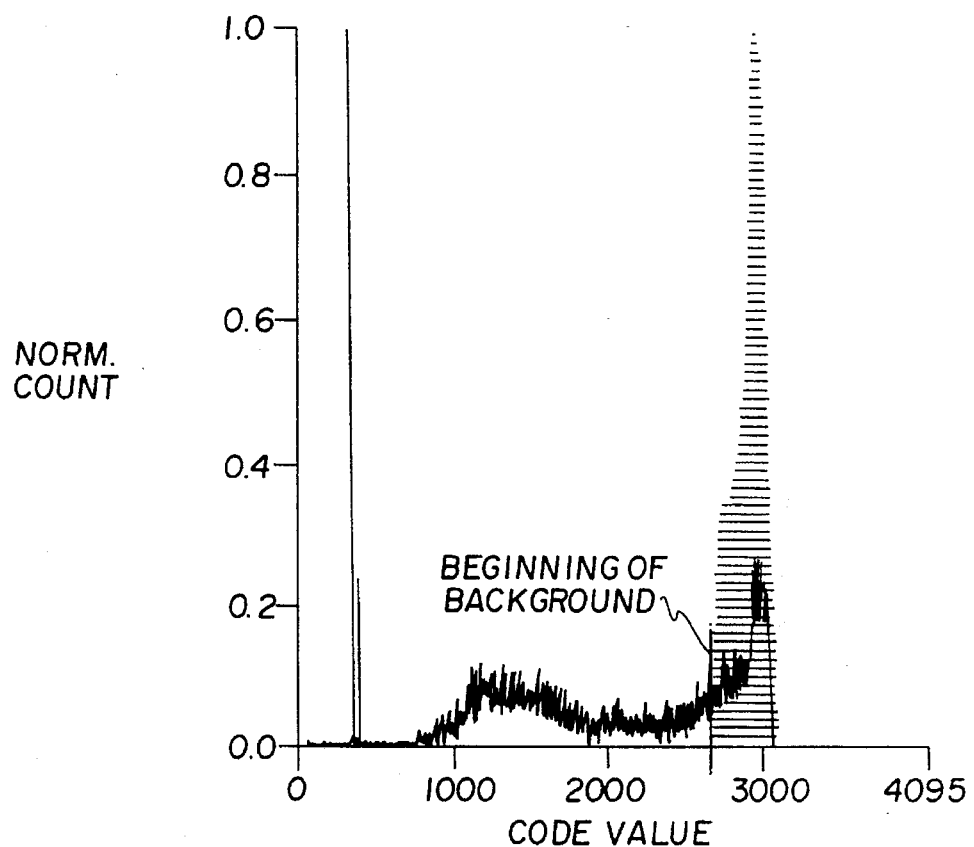
Figure 5C:
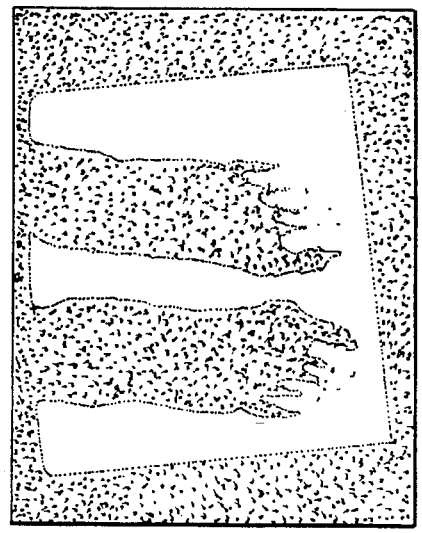

Referring now to FIGS. 3–5 there will be described examples of the method of the present invention. The key for each figure is as follows: FIGS. 3a, 4a, 5a are original x-ray images; FIGS. 3b, 4b, 5b are histograms of the original images shown in FIGS. 3a, 4a, 5a and the direct exposure region detected by the method of the present invention (hashed lines); FIGS. 3c, 4c, 5c depict the result of thresholding the image at a threshold equal to background left point.

FIG. 3a is an x-ray of an extremity, and FIGS. 3b and 3c nicely demonstrate the results of the inventive method in the presence of two background peaks. In such a situation, it is important to correctly find the beginning of the background region so that the skin line detection method works properly. This condition is very common in x-ray exams of this nature.

FIG. 4a is an x-ray of a hand. This is typical of images in which there is no overlap of the background pixels with body part pixels. (See; FIGS. 4b, 4c).

FIG. 5a is an x-ray of two feet. This is an image in which there does exist an overlap in the background code values with the body part code values (specifically the soft-tissue of the toes). This is due to non-uniformity in the background, which can be attributed to tilted x-ray source or heel effect (x-ray beam non-uniformity related to the angle at which the x-rays are emitted from the focal spot). The inventive method correctly detected the beginning of background code values, which occur on the left side of the image (FIG. 5a) near the upper ankle. One could argue that the threshold is not correct because the binarized image (FIG. 5c) is not white in the upper leftmost corner. However, in the inventive method, a border is defined around the image, outside of which no processing is done. The border is useful in excluding extraneous artifacts which can interfere, such as x-ray film cassette identification numbers. In this case, the border was set to 10 pixels, so that the first and last 10 lines/columns do not contribute to the analysis. Ignoring the pixels within the border caused the upper left corner of the background area in the image to be skipped in the analysis.

Figure 6A:
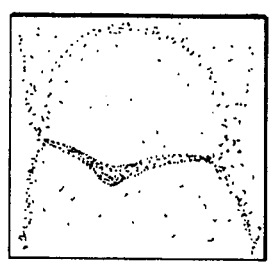
FIG. 6a–b are respectively an x-ray image with no background and a histogram of such image.
Figure 6B:
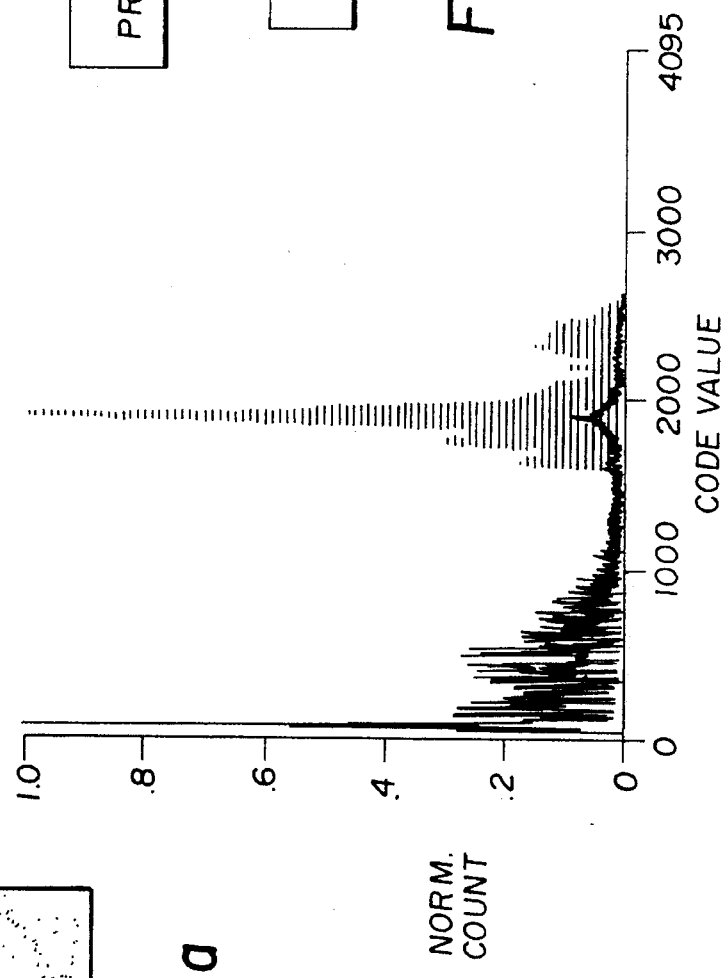

FIGS. 6a, 6b demonstrate a typical result for a knee image which has no direct x-ray exposure regions, yet significant transitions exist. FIG. 6b depicts both the gray level histogram and the background (hashed region) histogram. Note the significant distance between the peak of the background histogram and the last gray values in the gray level histogram. Also note the width of the background histogram relative to the background histograms shown in the previous examples, the width is much wider.

The invention has been described in detail with respect to preferred embodiments thereof, but it will be understood that variations and modifications can be effected within the spirit and scope of the invention.

What is claimed is:

1. A method of determining direct x-ray exposure regions in digital medical imaging comprising the steps of:

providing a digital medical image including a matrix of lines and columns of pixels;

evaluating significant transitions in line and column profiles to determine appropriate line and column thresholds;

evaluating all pixels which exceed the line/column threshold for structure by computing the variation within a moving window using a range statistic;

accumulating within a histogram pixels which exceed a threshold for that particular line or column and which contain variation indicative of direct x-ray exposure; and analyzing the background histogram to determine the beginning intensity or code value (left point) of the background region.

2. The method of claim 1 wherein said first evaluating step includes determining the threshold as the lowest of all the transition peaks found in the line or column.

3. The method of claim 2 wherein said first evaluating step includes determining the lowest transition peak as a floor threshold.

4. The method of claim 2 wherein in said first evaluating step no candidate transitions are determined, using as a threshold a preselected percentage of the average of transition peaks of all the significant transitions.

5. The method of claim 4 wherein said preselected percentage is about 95%.

6. The method of claim 1 wherein in said second evaluating step, for each line and column, the high and low code values are found and if the range is less than a preselected value, the next line or column is processed, but if otherwise a range statistic is utilized to characterize the variation in pixels using a moving window which contains pixel exceeding the threshold.

7. The method of claim 6 wherein a pixel is determined to be background using the following formula $$\frac{x_r}{d_n \sqrt{n}} < 3\sigma_z, d_n = 1.693 \text{ for } n = 3$$

where $x_R$ is the range over n samples, $d_n$ is a constant which defines the relationship of the range to standard deviation, $d_n = \mu_R/\sigma_x$; z is the index into the noise array which is chosen to be the high code value of the range; and $\sigma_z$ is the system noise.

8. The method of claim 1 wherein after said accumulating step, said histogram is smoothed by a Gaussian function and normalized by the highest peak to a value of one.

9. The method of claim 1 including the step of determining the right point of the histogram, determining the difference between the right point code value and the last code value of the gray level histogram, and if this difference is large, assuming that there is no direct x-ray exposure.

10. The method of claim 1 wherein a determination is made that there is no background if one of the following conditions is determined;

if the width of the peak as defined by the left and right points is large;

if the distance from the peak to the last code values of the gray level histogram is large;

if less than five significant transitions are found in said image.

11. The method of claim 1 including the step of creating a spatial segmentation mask which cab be applied to said original image.

12. The method of claim 11 wherein said step of creating includes the steps of performing a first histogram analysis for only some of said lines, and identifying pixels which demonstrate proper noise characteristics indicative of background and which exceed the threshold of the beginning code value of the direct x-ray exposure region of the histogram analysis.

13. The method of claim 11 wherein said step of creating includes the steps of marking all the pixels from said accumulating step which are candidates based upon transition and noise characteristics, and their setting marked pixels which are less than the beginning code value of the direct x-ray exposure region back to their original value.

* * * * *